United States Patent
Patel et al.

(10) Patent No.: US 10,871,547 B1
(45) Date of Patent: Dec. 22, 2020

(54) RADIOFREQUENCY BASED VIRTUAL MOTION MODEL FOR LOCALIZATION USING PARTICLE FILTER

(71) Applicant: FUJI XEROX CO., LTD., Tokyo (JP)

(72) Inventors: Miteshkumar Patel, San Mateo, CA (US); Jacob Biehl, San Jose, CA (US); Andreas Girgensohn, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/725,822

(22) Filed: Dec. 23, 2019

(51) Int. Cl.
  *H04W 4/80* (2018.01)
  *G01S 5/02* (2010.01)
  *H04B 17/318* (2015.01)
  *H04W 4/02* (2018.01)
  *G06K 9/62* (2006.01)

(52) U.S. Cl.
  CPC .......... *G01S 5/0294* (2013.01); *G06K 9/6267* (2013.01); *H04B 17/318* (2015.01); *H04W 4/027* (2013.01); *H04W 4/80* (2018.02)

(58) Field of Classification Search
  CPC .. G01S 5/0294; G06K 9/6267; H04B 17/318; H04W 4/80; H04W 4/027
  See application file for complete search history.

(56) References Cited

U.S. PATENT DOCUMENTS

| 8,633,817 | B2* | 1/2014 | Khorashadi | G01S 5/0252 340/539.13 |
| 10,142,793 | B2 | 11/2018 | Pandharipande et al. | |
| 2012/0007779 | A1* | 1/2012 | Klepal | G01S 5/021 342/451 |
| 2014/0139375 | A1* | 5/2014 | Faragher | G01S 5/0278 342/451 |
| 2016/0238690 | A1* | 8/2016 | Colucci | G01S 5/0294 |
| 2017/0176189 | A1* | 6/2017 | D'Aquila | G01C 21/12 |

OTHER PUBLICATIONS

Gu, Y. et al. "A Survey of Indoor Positioning Systems for Wireless Personal Networks" IEEE Communications Surveys & Tutorials, 2009, pp. 13-32, vol. 11, No. 1.

Vallivaara, I. et al. "Magnetic field-based SLAM method for solving the localization problem in mobile robot floor-cleaning task" The 15th International Conference on Advanced Robotics, Jun. 20-23, 2011, pp. 198-203, Tallinn, Estonia.

(Continued)

*Primary Examiner* — Julio R Perez
(74) *Attorney, Agent, or Firm* — Procopio, Cory, Hargreaves & Savitch LLP

(57) ABSTRACT

System is built using the particle filter (PF) framework which utilizes data from round trip time (RTT) ranging or BLE signal strength to perform both (1) sensing the environment by using the scan data during measurement phase and (2) detect motion state of the user which it utilized during the motion update phase of PF. To detect the motion state of the user the temporal difference of the received ranging scans is used over which is utilized within the PF framework. The primary advantage of the described technique is that the velocity parameter of the PF can dynamically be updated based on the motion state as estimated using ranging scans.

12 Claims, 5 Drawing Sheets

(56) References Cited

OTHER PUBLICATIONS

Li, F. et al. "A Reliable and Accurate Indoor Localization Method Using Phone Inertial Sensors" UbiComp '12, Sep. 5-Sep. 8, 2012, Pittsburgh, USA (10 pages).

Biswas, J. et al. "WiFi Localization and Navigation for Autonomous Indoor Mobile Robots" IEEE International Conference on Robotics and Automation, 2010, (7 pages).

Ravi, N. et al. "Indoor Localization Using Camera Phones" Seventh IEEE Workshop on Mobile Computing Systems Applications, 2006, pp. 1-16.

Collin, J. et al. "Pedestrian Dead Reckoning with Particle Filter for Handheld Smartphone" 2016 International Conference on Indoor Positioning and Indoor Navigation (IPIN), Oct. 4-7, 2016, Alcalá de Henares, Spain (8 pages).

Kendall, A. et al. "PoseNet: A Convolutional Network for Real-Time 6-DOF Camera Relocalization" ArXIV150507427, May 2015, pp. 2938-2946.

Kawaji, H. et al. "Image-based Indoor Positioning System: Fast Image Matching using Omnidirectional Panoramic Images" Proceedings of the 1st ACM International Workshop on Multimodal Pervasive Video Analysis, MPVA'10, Oct. 29, 2010, Firenze, Italy (4 pages).

Nurminen, H. et a. "Motion Model for Positioning with Graph-Based Indoor Map" 2014 International Conference on Indoor Positioning and Indoor Navigation (IPIN), Oct. 27-30, 2014, Busan, South Korea (11 pages).

Pei, L. et al. "Using LS-SVM Based Motion Recognition for Smartphone Indoor Wireless Positioning" Sensors, May 2012, pp. 6155-6175, vol. 12, No. 5.

Cillis, F. et al. "Indoor Positioning System using Walking Pattern Classification" 22nd Mediterranean Conference on Control and Automation (MED), Jun. 16-19, 2014, pp. 511-516, University of Palermo, Palermo, Italy.

Lupton, T. et al. "Visual-Inertial-Aided Navigation for High-Dynamic Motion in Built Environments Without Initial Conditions" IEEE Transactions on Robotics, Feb. 2012, pp. 61-76, vol. 28, No. 1.

Wang, S. et al. "End-to-end, sequence-to-sequence probabilistic visual odometry through deep neural networks" International Journal of Robotics Research, Apr. 2018, pp. 513-542, vol. 37, No. 4-5.

\* cited by examiner

RADIOFREQUENCY BASED VIRTUAL MOTION MODEL FOR LOCALIZATION USING PARTICLE FILTER

BACKGROUND OF THE INVENTION

Technical Field

The disclosed embodiments relate in general to localization and tracking systems and methods and, more specifically, to radiofrequency based virtual motion model for localization using particle filter.

Description of the Related Art

The spreading of personal communication systems into many public and private places, as well as the onset of new generation of smartphones, has enabled the development of location based services (LBS) platform which are based on standard wireless communication technologies, as described in Y. Gu, A. Lo, and I. Niemegeers, "A survey of indoor positioning systems for wireless personal networks," *IEEE Commun. Surv. Tutor.*, vol. 11, no. 1, pp. 13-32, First 2009. Localization using variety of sensors such as Magnetometer as described in I. Vallivaara, J. Haverinen, A. Kemppainen, and J. Röning, "Magnetic field-based SLAM method for solving the localization problem in mobile robot floor-cleaning task," in 2011 15th *International Conference on Advanced Robotics (ICAR)*, 2011, pp. 198-203, IMU, as described in F. Li, C. Zhao, G. Ding, J. Gong, C. Liu, and F. Zhao, "A Reliable and Accurate Indoor Localization Method Using Phone Inertial Sensors," in *Proceedings of the 2012 ACM Conference on Ubiquitous Computing*, New York, N.Y., USA, 2012, pp. 421-430, Radio Frequency (WiFi or BLE) as described in J. Biswas and M. Veloso, "WiFi localization and navigation for autonomous indoor mobile robots," in 2010 *IEEE International Conference on Robotics and Automation*, 2010, pp. 4379-4384, images as described in and fusion of these sensors has been developed and experimented by different research groups.

Traditionally, user motion is detected using IMU sensor described in J. Racko, P. Brida, A. Perttula, J. Parviainen, and J. Collin, "Pedestrian Dead Reckoning with Particle Filter for handheld smartphone," in 2016 *International Conference on Indoor Positioning and Indoor Navigation (IPIN)*, 2016, pp. 1-7 and/or using images from the camera from smart devices as described in A. Kendall, M. Grimes, and R. Cipolla, "PoseNet: A Convolutional Network for Real-Time 6-DOF Camera Relocalization," ArXiv150507427 Cs, May 2015 and H. Kawaji, K. Hatada, T. Yamasaki, and K. Aizawa, "Image-based Indoor Positioning System: Fast Image Matching Using Omnidirectional Panoramic Images," in *Proceedings of the 1st ACM International Workshop on Multimodal Pervasive Video Analysis*, New York, N.Y., USA, 2010, pp. 1-4, which is utilized within localization algorithm such as PF, Kalman Filter (KF) and their extensions. In Pedestrian Dead Reckoning (PDR)-PF based localization system, step counter is used to deterministically calculate the steps taken by user which is further used to calculate displacement of the smart device user. In J. Racko, P. Brida, A. Perttula, J. Parviainen, and J. Collin, "Pedestrian Dead Reckoning with Particle Filter for handheld smartphone," in 2016 *International Conference on Indoor Positioning and Indoor Navigation (IPIN)*, 2016, pp. 1-7, the authors utilizes a fixed displacement and fuse it with heading angle calculated using gyroscope. Nurminen et. al. utilized combination step detection, orientation, map and WLAN info to estimate the position of the user, as described in H. Nurminen, M. Koivisto, S. Ali-Löytty, and R. Piché, "Motion model for positioning with graph-based indoor map," in 2014 *International Conference on Indoor Positioning and Indoor Navigation (IPIN)*, 2014, pp. 646-655. Similarly, Wei and Akinci used a deep learning model to estimate the position. Primary drawback of IMU based PDR system is that the 3-axis gyroscope sensor drifts over time, which makes the sensor data noisy. Similarly, vision based system requires representative features to be captured in a given image to perform localization.

As would be appreciated by persons of ordinary skill in the art, each of the described localization sensors has its own limitations in terms of noise, sampling rate, characteristics and/or dimensionality, which pose challenges in terms of generating stable localization. For example, using cameras can raise privacy concerns, which can limit the application of such systems. Moreover, in indoors, radio signals are severely impacted due to shadowing and multipathing effects, which make the available wireless-based positioning systems less accurate. Therefore, in view of the aforesaid limitations of the conventional technology, new and improved systems and methods are needed for stable indoor localization and motion tracking.

SUMMARY OF THE INVENTION

The embodiments described herein are directed to methods and systems that substantially obviate one or more of the above and other problems associated with conventional localization and motion tracking systems.

In accordance with one aspect of the inventive concepts described herein, there is provided a computer-implemented method, the method being performed in a computerized system comprising a central processing unit, a localization signal receiver and a memory, the computer-implemented method comprising: receiving at least one localization signal using the localization signal receiver; detecting user's motion state based on the received at least one localization signal; determining at least one velocity parameter of the user's motion state based on the detected user's motion; and determining a position of the user based at least on the received localization signal and the determined at least one velocity parameter of the user's motion.

In one or more embodiments, determining the position of the user comprises continuously executing a particle filter loop based on the received at least one localization signal and the determined at least one velocity parameter of the user's motion.

In one or more embodiments, continuously executing the particle filter loop and detecting user's motion state are performed in parallel.

In one or more embodiments, continuously executing the particle filter loop comprises performing a measurement update, performing a motion update, and resampling a plurality of particles.

In one or more embodiments, performing the measurement update comprises calculating a distance between each of a plurality of particles and at least one radiofrequency beacon based on the received radiofrequency signal.

In one or more embodiments, performing the measurement update comprises updating a plurality of particles using a confidence of a classifier.

In one or more embodiments, resampling the plurality of particles comprises calculating a weight for each of a plurality of particles and replicating particles of the plurality of particles with higher weights.

In one or more embodiments, the measurement update is performed based on a second received at least one localization signal.

In one or more embodiments, the motion update is performed based on a second velocity parameter of the user's motion state.

In one or more embodiments, receiving the at least one localization signal comprises determining a round trip time of the at least one localization signal.

In one or more embodiments, the user's motion state is detected based on the determined round trip time at two subsequent time points.

In one or more embodiments, receiving the at least one localization signal comprises determining a strength of the at least one localization signal.

In one or more embodiments, the at least one localization signal is a radiofrequency signal.

In one or more embodiments, the at least one localization signal is a Bluetooth Low Energy (BLE) signal.

In one or more embodiments, the at least one localization signal is a WIFI round trip time (WIFI RTT) signal.

In one or more embodiments, determining a position of the user comprises determining coordinates of the user.

In accordance with another aspect of the inventive concepts described herein, there is provided a non-transitory computer-readable medium embodying a set of computer-executable instructions, which, when executed in connection with a system comprising a central processing unit, a localization signal receiver and a memory, cause the system to perform a method comprising: receiving at least one localization signal using the localization signal receiver; detecting user's motion state based on the received at least one localization signal; determining at least one velocity parameter of the user's motion state based on the detected user's motion; and determining a position of the user based at least on the received localization signal and the determined at least one velocity parameter of the user's motion.

In accordance with yet another aspect of the inventive concepts described herein, there is provided a system comprising a central processing unit, a localization signal receiver and a memory, the memory storing a set of computer-readable instructions causing the system to perform a method comprising: receiving at least one localization signal using the localization signal receiver; detecting user's motion state based on the received at least one localization signal; determining at least one velocity parameter of the user's motion state based on the detected user's motion; and determining a position of the user based at least on the received localization signal and the determined at least one velocity parameter of the user's motion.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

Figure 1:
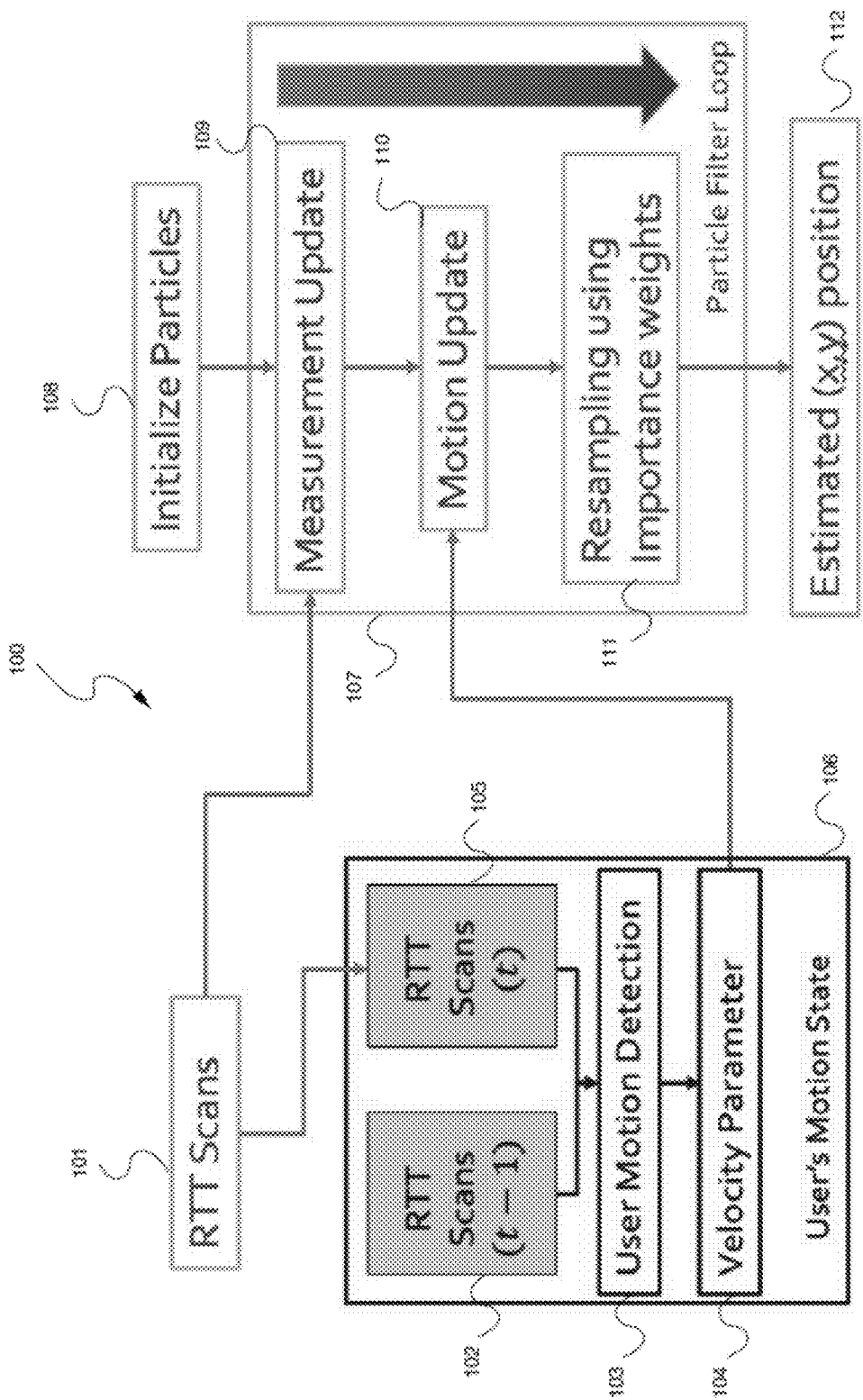
FIG. 1 illustrates an exemplary flowchart of an embodiment of the described system.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

As would be appreciated by persons of ordinary skill in the art, estimation motion and/or distance traveled by the user is challenging as it requires the smart device to be held in a specific orientation to estimate the correct distance traveled using Inertial Measurement Unit (IMU) and/or requires representative features for a vision based system. Both these sensors have limitations in terms of time varying drift inherent in IMU and minimal representative features required.

Therefore, in accordance with one aspect of the embodiments described herein, a novel technique is provided that addresses the issue of estimating the motion of the user by taking the temporal measurements of a ranging system such as WiFi RTT and/or BLE beacon. One described embodiment assists in estimating the motion state of the user (e.g. dwell state, slow walk, fast walk) which is further utilized during the motion update phase of the Particle Filter (PF). The estimated motion state is used to sample from different velocity parameter which in-turn assists in improving both the overall localization of the user as well as room level localization.

In one or more embodiments, the system is built using the PF framework which utilizes data from RTT ranging or BLE signal strength to perform both (1) sensing the environment by using the scan data during measurement phase and (2) detect motion state of the user which it utilized during the motion update phase of PF. To detect the motion state of the user the temporal difference of the received ranging scans is used over which is utilized within the PF framework. A primary advantage of the described embodiment is that the velocity parameter of the PF can dynamically be updated based on the motion state as estimated using ranging scans.

One described embodiment of the system uses RTT ranging because of its higher accuracy compared to distance estimates based on BLE signal strength. This embodiment of the system consists of two blocks, i.e., the users' motion state detector and PF based users' location estimator. Description of each block is detailed below.

FIG. 1 illustrates an exemplary flowchart 100 of an embodiment of the described system. As shown in FIG. 1, the exemplary flowchart 100 includes user motion state estimator 106 and particle filter loop 107. The respective blocks 106 and 107 of the flowchart 100 will be described in detail below.

Users' Motion State Estimator

The RTT scans 101 are directly used by the measurement update routine 109 of the particle filter loop 107 to update the particles (environment sensing). The RTT scans information at two different times (t-1) and (t), 102 and 105 respectively, are also utilized to derive the users' motion state 106 (motion update 110), which is further utilized to optimize the velocity parameter 104 used by the motion update phase 110 of the PF.

As shown in FIG. 1, motion state estimator 106 utilizes the RF scans from RTT sensor and calculates the average distance traveled between the scans received at time (t-1) (102) and (t) (105). This distance is further utilized by the user motion detection block 103 to recognize the state of the user (e.g. Dwell, Slow Walk, Fast Walk, Run). The estimated user state is used to dynamically change the velocity parameter 104 used by the motion update phase 110 of the particle filter loop 107. The change in velocity parameter enables particle filter loop 107 to get a better representation of user's motion rather than using a fixed velocity parameter.

Particle Filter Loop

The aforesaid particle filter loop 107 operates based on a Sequential Monte Carlo technique, well known to persons of ordinary skill in the art, as sample Importance Resampling (SIR) filter to solve the problem of global localization and tracking the device trajectory. Particle filtering uses a set of imaginary particles (also called samples, each having coordinates (x,y) and velocities (vx, vy)) to represent the posterior distribution of a stochastic process given noisy and/or partial observations. Exemplary operation of the particle filter loop is describe in detail in U.S. Patent Application Publication 20180332369 A1, incorporated herein by reference.

In one or more embodiments, the particle filter loop 107 operates in parallel with user motion state estimator 106. After initializing the particles at step 108, the particle filter loop 107 utilizes the raw RTT sensor data during the measurement update phase 109. Further during the motion update 110, the PF utilizes the velocity parameter 104 available from the user motion state estimator 106 from which it samples the velocity of the particles. It should be noted that the velocity parameter 104 is updated every iteration of the particle filter loop 107 based on the estimated motion state of the user.

In one or more embodiments, the system utilizes data from RTT sensor to serve dual purpose. Firstly, the RTT scans are used as environment sensor, which provides the distance from anchors deployed in a given environment to each particles of PF. This is used to update the state of the particles. Further, proxy information about the motion of the user is derived from the RTT scans. In one or more embodiments, this is done by taking the temporal difference between scans received over time period. One or more embodiments of the described system classifies the motion state of the user into four classes such as dwell state, slow walking and fast walking. Based on these states the velocity parameter used by the motion update phase the particle filter loop 107 are dynamically updated, see step 110. This is in contrast to the random walk motion model used in our baseline experiments where the velocity parameter for each particle is sampled from a constant. Subsequently, the particles are re-samples using importance weights, see step 111. The output of the particle filter loop 107 is estimated (x, y) user's position 112.

Lastly, it should be noted that the described embodiments are capable of deriving proxy information from a single sensor, which can used to develop a motion model, which is more representative of the users' actual motion. This in-turn leads to better estimation using particle filter. One or more embodiments can dynamically update the velocity, acceleration, and motion direction of the user based on their motion state detected using the measurements from a ranging system. This is in contrast to existing systems that rely on local sensors such as accelerometers. As would be appreciated by persons of ordinary skill in the art, the described techniques may be utilized for indoor localization, user motion state detection as well as room level localization.

Computing Platform

Figure 2:
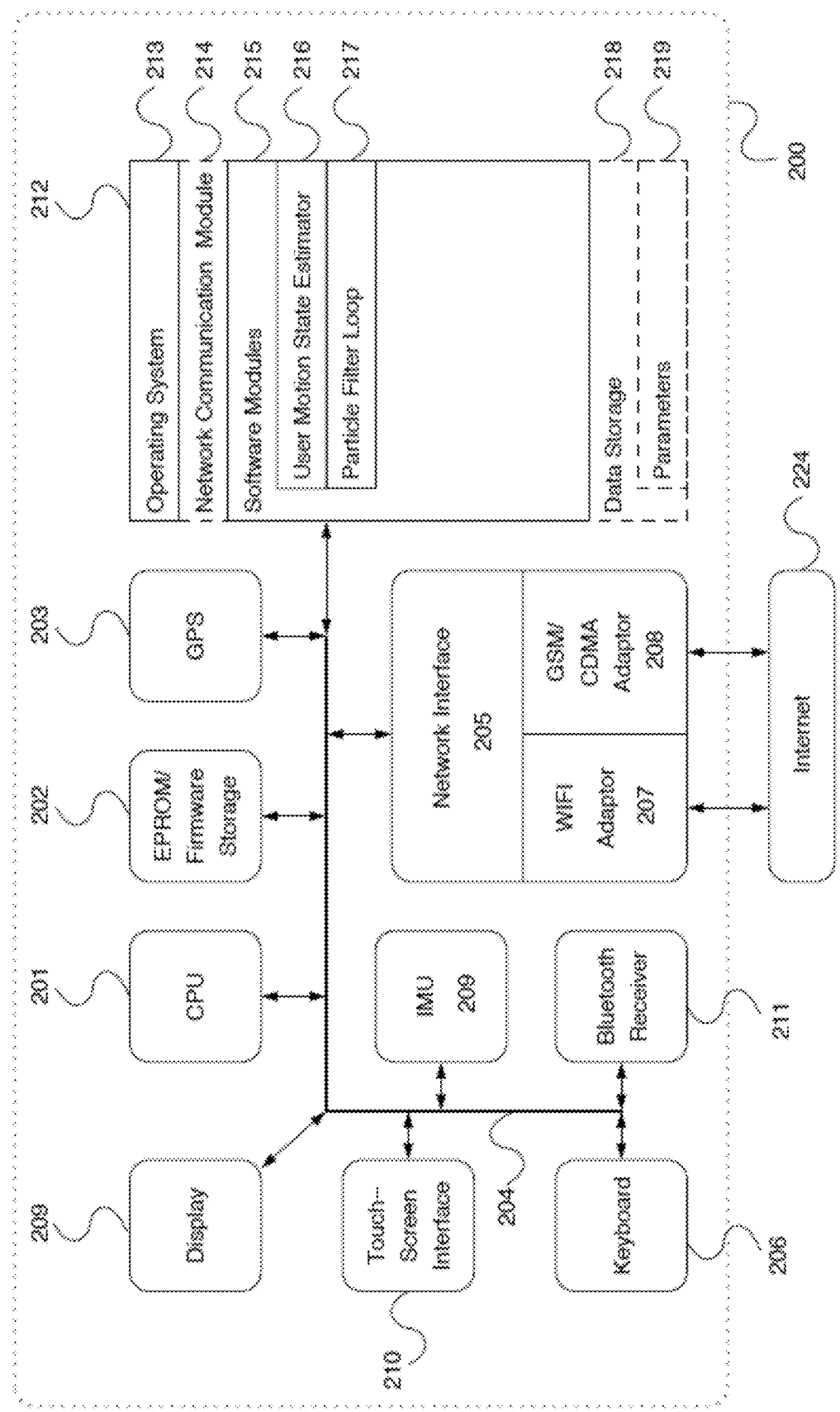
FIG. 2 illustrates an exemplary embodiment of a computerized mobile system that could be used in connection with the system illustrated in FIG. 1.

FIG. 2 illustrates an exemplary embodiment of a computerized mobile system 200 that could be used in connection with the system illustrated in FIG. 1. In one or more embodiments, the computerized mobile system 200 may be implemented within a form factor of a mobile computing device, such as a smartphone, a personal digital assistant (PDA), a tablet computer, or a smart watch, all of which are widely available commercially and are well known to persons of skill in the art.

The computerized system 200 may include a data bus 204 or other interconnect or communication mechanism for communicating information across and among various hardware components of the mobile computerized system 200, and a central processing unit (CPU or simply processor) 201 coupled with the data bus 204 for processing information and performing other computational and control tasks. Computerized system 200 also includes a memory 212, such as a random access memory (RAM) or other dynamic storage device, coupled to the data bus 204 for storing various information as well as instructions to be executed by the processor 201. The memory 212 may also include persistent storage devices, such as a magnetic disk, optical disk, solid-state flash memory device or other non-volatile solid-state storage devices.

In one or more embodiments, the memory 212 may also be used for storing temporary variables or other intermediate information during execution of instructions by the processor 201. Optionally, computerized system 200 may further include a read only memory (ROM or EPROM) 202 or other static storage device coupled to the data bus 204 for storing static information and instructions for the processor 201, such as firmware necessary for the operation of the computerized system 200, basic input-output system (BIOS), as well as various configuration parameters of the computerized system 200.

In one or more embodiments, the computerized system 200 may incorporate a display device 209, which may be also coupled to the data bus 204, for displaying various information to a user of the computerized system 200. In an alternative embodiment, the display device 209 may be associated with a graphics controller and/or graphics processor (not shown). The display device 209 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 209 may be incorporated into the same general enclosure with the remaining components of the computerized system 200. In an alternative embodiment, the display device 209 may be positioned outside of such enclosure.

In one or more embodiments, the computerized system 200 may further incorporate a GPS receiver 203 connected to the data bus 204 and configured to receive location information from one or more GPS satellites and transmit this information to the processor 201 via the data bus 204.

In one or more embodiments, the computerized system 200 may incorporate one or more input devices, such as a touchscreen interface 210 for receiving tactile commands and a keyboard 206, which all may be coupled to the aforesaid data bus 204 for communicating information, including, without limitation, user command selections to the processor 201. In an alternative embodiment, input devices may include a system for tracking eye movements of the user (not shown), which may be used to indicate to the computerized system 200 the command selection by the user.

In one or more embodiments, the computerized system 200 may additionally include a location signal receiver 103, such as a Bluetooth receiver, configured to perform scan for beacons 106 and supply scan data described above to the processor 201 via the data bus 204. In addition, the IMU 102 may be also connected to the data bus 204.

In one or more embodiments, the computerized system 200 may additionally include a communication interface, such as a network interface 205 coupled to the data bus 204. The network interface 205 may be configured to establish a connection between the computerized system 200 and the Internet 224 using at least one of WIFI interface 207 and the cellular network (GSM or CDMA) adaptor 208. The network interface 205 may be configured to provide a two-way data communication between the computerized system 200 and the Internet 224. The WIFI interface 207 may operate in compliance with 802.11a, 802.11b, 802.11g and/or 802.11n protocols as well as Bluetooth protocol well known to persons of ordinary skill in the art. In an exemplary implementation, the WIFI interface 207 and the cellular network (GSM or CDMA) adaptor 208 send and receive electrical or electromagnetic signals that carry digital data streams representing various types of information. For example, the aforesaid networking components may be used to establish a network data connection between the computerized system 200 and other network components.

In one or more embodiments, the Internet 224 typically provides data communication through one or more sub-networks to other network resources. Thus, the computerized system 200 is capable of accessing a variety of network resources located anywhere on the Internet 224, such as web servers, other content servers as well as other network data storage resources. In one or more embodiments, the computerized system 200 is configured send and receive messages, media and other data, including application program code, through a variety of network(s) including Internet 224 by means of the network interface 205. In the Internet example, when the computerized system 200 acts as a network client, it may request code or data for an application program executing on the computerized system 200. Similarly, it may send various data or computer code to other network resources.

In one or more embodiments, the functionality described herein is implemented by computerized system 200 in response to processor 201 executing one or more sequences of one or more instructions contained in the memory 212. Such instructions may be read into the memory 212 from another computer-readable medium. Execution of the sequences of instructions contained in the memory 212 causes the processor 201 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 201 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 201 for execution. For example, the instructions may initially be carried on a magnetic disk from a remote computer. Alternatively, a remote computer can load the instructions into its dynamic memory and send the instructions over the Internet 224. Specifically, the computer instructions may be downloaded into the memory 212 of the computerized system 200 from the foresaid remote computer via the Internet 224 using a variety of network data communication protocols well known in the art.

In one or more embodiments, the memory 212 of the computerized system 200 may store any of the following software programs, applications or modules:

1. Operating system (OS) 213, which may be a mobile operating system for implementing basic system services and managing various hardware components of the computerized system 200. Exemplary embodiments of the operating system 213 are well known to persons of skill in the art, and may include any now known or later developed mobile operating systems.

2. Network communication module 214 for enabling network communications using one or more network interfaces described below.

3. Software modules 215 may include, for example, a set of software applications executed by the processor 201 of the computerized system 200, which cause the computerized mobile system 300 to perform certain predetermined functions, such as receive the beacon signals as described above. In one or more embodiments, the software modules 215 may include, for example, the user motion state estimator 216 as well as particle filter loop 217, also shown in FIG. 1 (elements 106 and 107, respectively).

4. Data storage 218 may be used, for example, for storing various parameters 219, such as particle coordinates and velocities.

Figure 3:
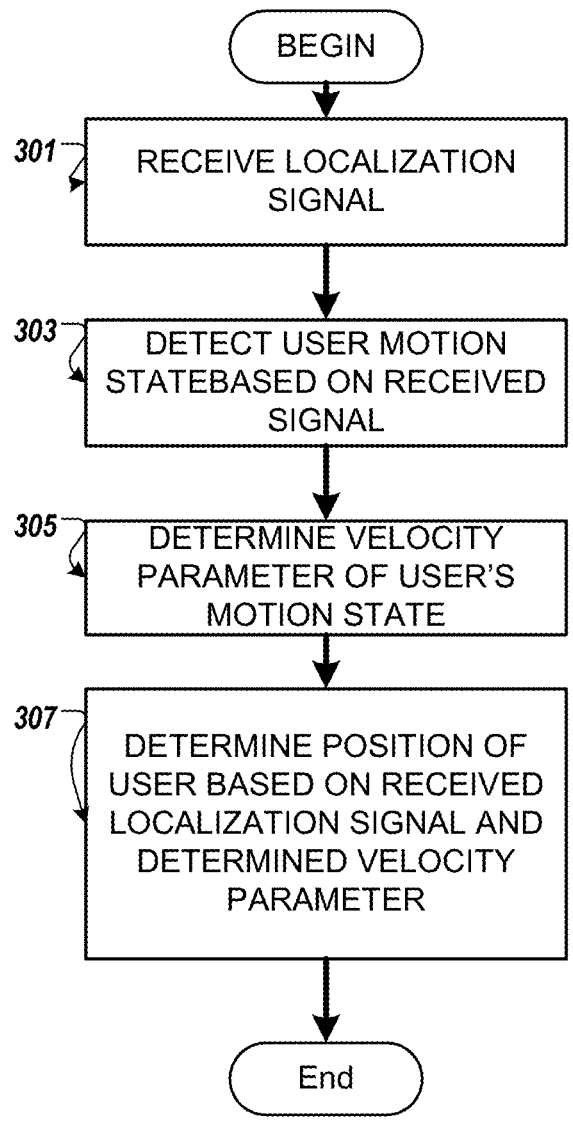
FIG. 3 illustrates an example process for some example implementations.

FIG. 3 illustrates an example process 300 according to the example implementations. The example process 300 may be performed on one or more devices, as explained herein.

At 301, at least one localization signal is received, using, for example, the localization signal receiver.

At 303, a user's motion state is detected, based on, for example but not by way of limitation, the received at least one localization signal.

At 305, at least one velocity parameter of the user's motion state is determined, based on the detected user's motion.

At 307, a position of the user is determined, based at least on the received localization signal and the determined at least one velocity parameter of the user's motion.

Figure 4:
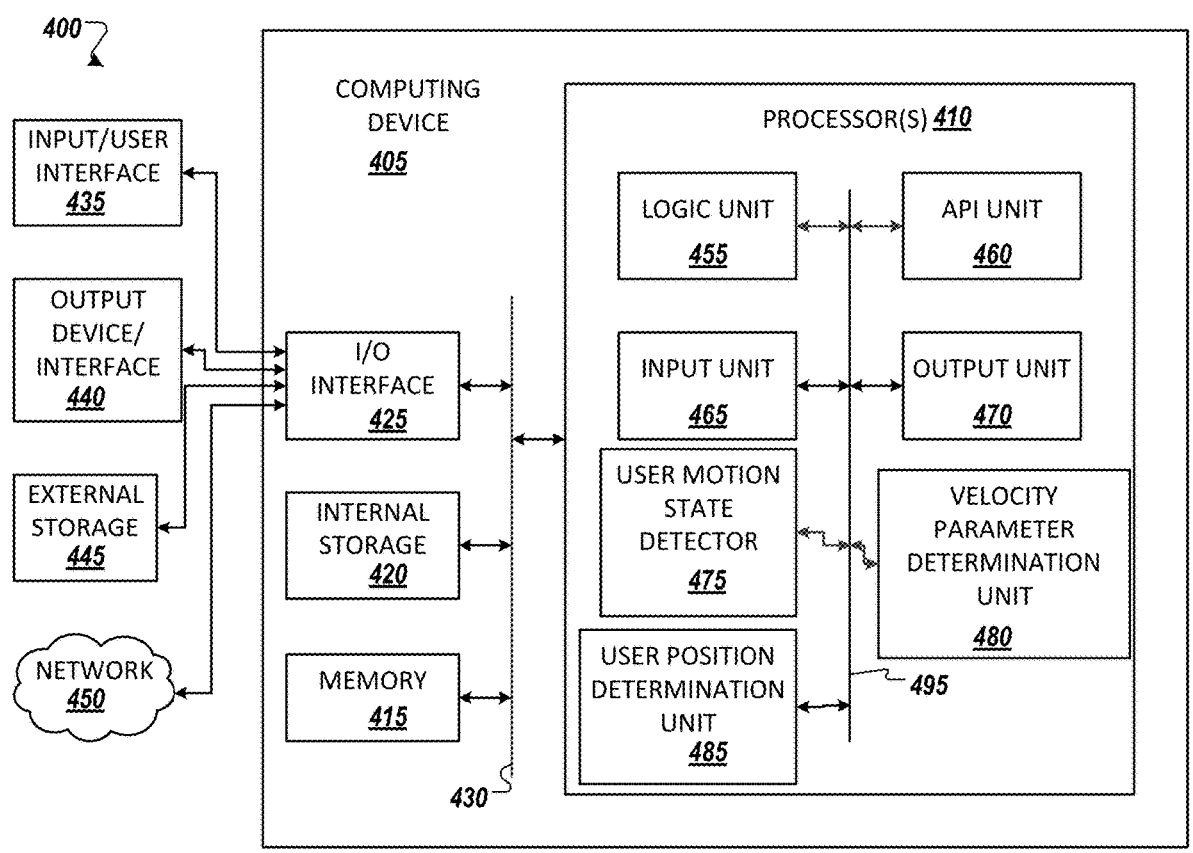
FIG. 4 illustrates an example computing environment with an example computer device suitable for use in some example implementations.

FIG. 4 illustrates an example computing environment 400 with an example computer device 405 suitable for use in some example implementations. Computing device 405 in computing environment 400 can include one or more processing units, cores, or processors 410, memory 415 (e.g., RAM, ROM, and/or the like), internal storage 420 (e.g., magnetic, optical, solid state storage, and/or organic), and/or I/O interface 425, any of which can be coupled on a communication mechanism or bus 430 for communicating information or embedded in the computing device 405.

Computing device 405 can be communicatively coupled to input/interface 435 and output device/interface 440. Either one or both of input/interface 435 and output device/interface 440 can be a wired or wireless interface and can be detachable. Input/interface 435 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 440 may include a display, television, monitor, printer, speaker, braille, or the like. In some example implementations, input/interface 435 (e.g., user interface) and output device/interface 440 can be embedded with, or physically coupled to, the computing device 405. In other example implementations, other computing devices may function as, or provide the functions of, an input/interface 435 and output device/interface 440 for a computing device 405.

Examples of computing device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 405 can be communicatively coupled (e.g., via I/O interface 425) to external storage 445 and network 450 for communicating with any number of networked components, devices, and systems, including one or more computing devices of the same or different configuration. Computing device 405 or any connected computing device can be functioning as, providing services of, or referred to as, a server, client, thin server, general machine, special-purpose machine, or another label. For example but not by way of limitation, network 450 may include the blockchain network, and/or the cloud.

I/O interface 425 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computing device 405 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 410 can execute under any operating system (OS) (not shown), in a native or virtual environment. One or more applications can be deployed that include logic unit 455, application programming interface (API) unit 460, input unit 465, output unit 470, user motion state detector 475, velocity parameter determination unit 480, user position determination unit 485, and inter-unit communication mechanism 495 for the different units to communicate with each other, with the OS, and with other applications (not shown).

For example, the user motion state detector 475, the velocity parameter determination unit 480, and the user position determination unit 485 may implement one or more processes shown above with respect to the structures described above. The described units and elements can be varied in design, function, configuration, or implementation and are not limited to the descriptions provided.

In some example implementations, when information or an execution instruction is received by API unit 460, it may be communicated to one or more other units (e.g., logic unit 455, input unit 465, user motion state detector 475, velocity parameter determination unit 480, and user position determination unit 485).

In some instances, the logic unit 455 may be configured to control the information flow among the units and direct the services provided by API unit 460, input unit 465, user motion state detector 475, velocity parameter determination unit 480, and user position determination unit 485 in some example implementations described above. For example, the flow of one or more processes or implementations may be controlled by logic unit 455 alone or in conjunction with API unit 460.

Figure 5:
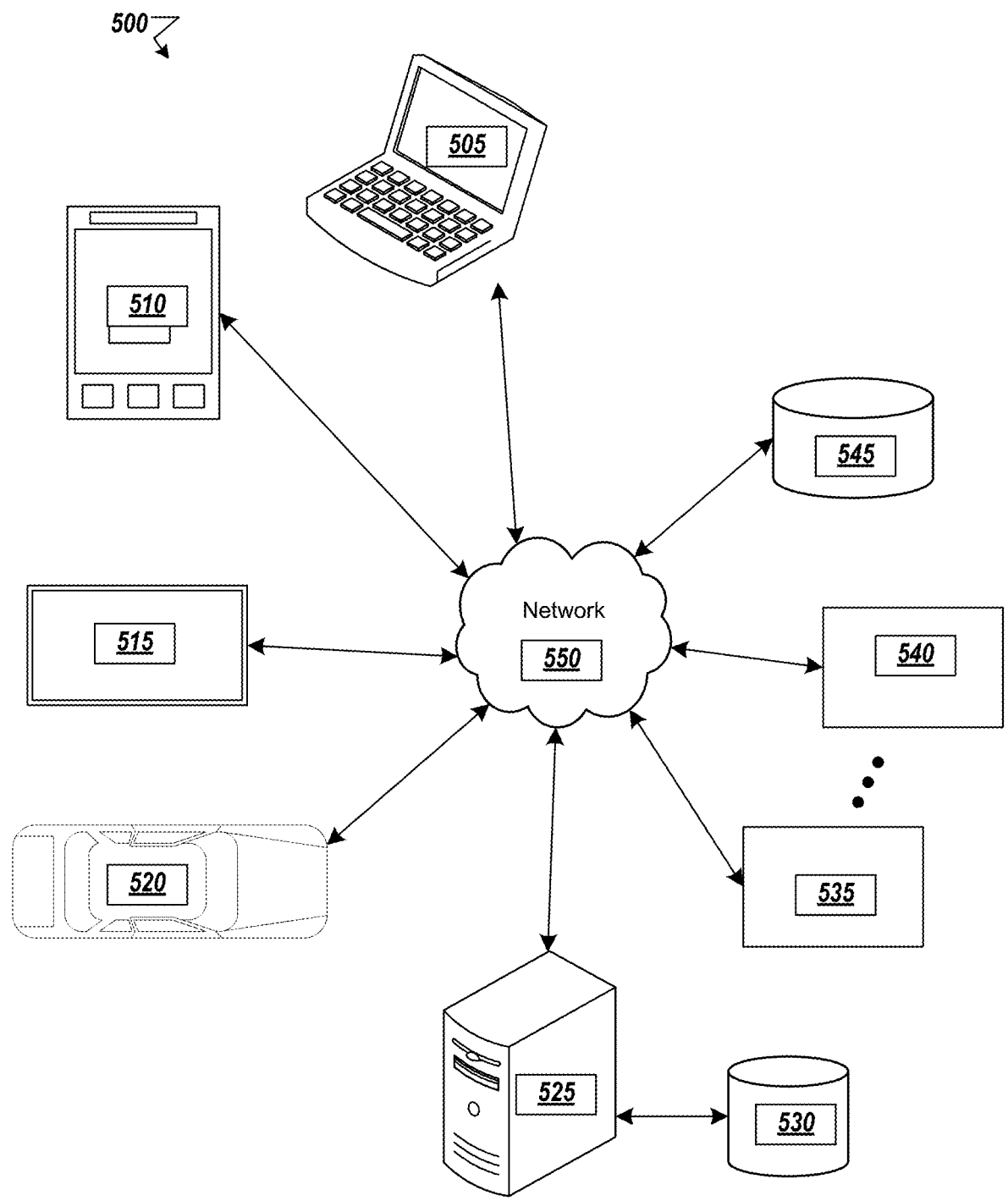
FIG. 5 shows an example environment suitable for some example implementations.

FIG. 5 shows an example environment suitable for some example implementations. Environment 500 includes devices 505-545, and each is communicatively connected to at least one other device via, for example, network 560 (e.g., by wired and/or wireless connections). Some devices may be communicatively connected to one or more storage devices 530 and 545.

An example of one or more devices 505-545 may be computing devices 505 described in FIG. 5, respectively. Devices 505-545 may include, but are not limited to, a computer 505 (e.g., a laptop computing device) having a monitor and an associated webcam as explained above, a mobile device 510 (e.g., smartphone or tablet), a television 515, a device associated with a vehicle 520, a server computer 525, computing devices 535-540, storage devices 530 and 545. In some implementations, devices 505-520 may be considered user devices associated with the users. Devices 525-545 may be devices associated with service providers.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in radiofrequency based virtual motion model for localization using particle filter. It is intended that the specification and examples be considered as exemplary only, with a true scope and spirit of the invention being indicated by the following claims.

What is claimed is:

1. A computer-implemented method, the method being performed in computerized system comprising a central processing unit, a localization signal receiver and a memory, the computer-implemented method comprising, iteratively:
   receiving at least one localization signal using the localization signal receiver;
   determining a round trip time for the at least one localization signal;
   determining at least one velocity parameter of a user's motion state based on the determined round trip time and a preceding round trip time of a preceding iteration;
   executing a particle filter loop based at least on the received localization signal and the determined at least one velocity parameter of the user's motion, the particle filter loop comprises performing a measurement update using at least the determined round trip time and calculating a distance between each of a plurality of particles and at least one radiofrequency beacon based on the received radiofrequency localization signal, performing a motion update using at least the at least one velocity parameter, and resampling a plurality of particles; and
   determining a position of the user based at least on the execution of the particle filter loop, wherein determining the position of the user comprises continuously executing the particle filter loop in parallel with determining the at least one velocity parameter.

2. The computer-implemented method of claim 1, wherein performing the measurement update comprises updating a plurality of particles using a confidence of a classifier.

3. The computer-implemented method of claim 1, wherein resampling the plurality of particles comprises calculating a weight for each of a plurality of particles and replicating particles of the plurality of particles with higher weights.

4. The computer-implemented method of claim 1, wherein the measurement update is performed based on a second received at least one localization signal.

5. The computer-implemented method of claim 1, wherein the motion update is performed based on a second velocity parameter of the user's motion state.

6. The computer-implemented method of claim 1, wherein receiving the at least one localization signal comprises determining a strength of the at least one localization signal.

7. The computer-implemented method of claim 1, wherein the at least one localization signal is a radiofrequency (RF) signal.

8. The computer-implemented method of claim 1, wherein the at least one localization signal is a Bluetooth Low Energy (BLE) signal.

9. The computer-implemented method of claim 1, wherein the at least one localization signal is a WIFI round trip time (WIFI RTT) signal.

10. The computer-implemented method of claim 1, wherein determining a position of the user comprises determining coordinates of the user.

11. A non-transitory computer-readable medium embodying a set of computer-executable instructions, which, when executed in connection with a system comprising a central processing unit, a localization signal receiver and a memory, cause the system to perform a method comprising, iteratively:
   receiving at least one localization signal using the localization signal receiver;
   determining a round trip time for the at least one localization signal;
   determining at least one velocity parameter of a user's motion state based on the determined round trip time and a preceding round trip time of a preceding iteration;
   executing a particle filter loop based at least on the received localization signal and the determined at least one velocity parameter of the user's motion, the particle filter loop comprises performing a measurement update using at least the determined round trip time and calculating a distance between each of a plurality of particles and at least one radiofrequency beacon based on the received radiofrequency localization signal, performing a motion update using at least the at least one velocity parameter, and resampling a plurality of particles; and
   determining a position of the user based at least on the execution of the particle filter loop, wherein determining the position of the user comprises continuously executing the particle filter loop in parallel with determining the at least one velocity parameter.

12. A system comprising a central processing unit, a localization signal receiver and a memory, the memory storing a set of computer-readable instructions causing the system to perform a method comprising, iteratively:

receiving at least one localization signal using the localization signal receiver;

determining a round trip time for the at least one localization signal;

determining at least one velocity parameter of a user's motion state based on the determined round trip time and a preceding round trip time of a preceding iteration;

executing a particle filter loop based at least on the received localization signal and the determined at least one velocity parameter of the user's motion, the particle filter loop comprises performing a measurement update using at least the determined round trip time and calculating a distance between each of a plurality of particles and at least one radiofrequency beacon based on the received radiofrequency localization signal, performing a motion update using at least the at least one velocity parameter, and resampling a plurality of particles; and determining a position of the user based at least on the execution of the particle filter loop, wherein determining the position of the user comprises continuously executing the particle filter loop in parallel with determining the at least one velocity parameter.

\* \* \* \* \*